US009630634B2

(12) United States Patent
Nakamura (10) Patent No.: US 9,630,634 B2
(45) Date of Patent: Apr. 25, 2017

(54) TRAVELING ROUTE STRUCTURE OF CONVEYING TRAVELING BODY

(71) Applicant: Jiro Nakamura, Osaka (JP)

(72) Inventor: Jiro Nakamura, Osaka (JP)

(73) Assignee: Daifuku Co., Ltd. (JP)

( * ) Notice: Subject to any disclaimer, the term of this patent is extended or adjusted under 35 U.S.C. 154(b) by 26 days.

(21) Appl. No.: 14/815,456

(22) Filed: Jul. 31, 2015

(65) Prior Publication Data

US 2015/0336593 A1 Nov. 26, 2015

Related U.S. Application Data

(63) Continuation of application No. PCT/JP2014/051802, filed on Jan. 28, 2014.

(30) Foreign Application Priority Data

Mar. 28, 2013 (JP) .................................. 2013-068432

(51) Int. Cl.
*B61J 1/00* (2006.01)
*B61B 13/12* (2006.01)
*B65G 49/04* (2006.01)

(52) U.S. Cl.
CPC .............. *B61J 1/00* (2013.01); *B61B 13/125* (2013.01); *B65G 49/0445* (2013.01)

(58) Field of Classification Search
CPC .... B65G 35/06; B65G 49/0445; B61B 10/04; B61B 10/064; B61B 13/125; B61J 1/00; B61J 1/02
See application file for complete search history.

(56) References Cited

U.S. PATENT DOCUMENTS

| 4,438,701 | A | * | 3/1984 | Murai | ..................... B61B 10/04 104/140 |
| 4,440,090 | A | * | 4/1984 | Murai | ..................... E04H 6/36 104/127 |
| 4,724,944 | A | * | 2/1988 | Koshigai | ................ B62D 65/18 104/172.4 |
| 5,033,394 | A | * | 7/1991 | Summa | ................... B61B 10/04 104/106 |

(Continued)

FOREIGN PATENT DOCUMENTS

JP H0848406 A 2/1996
JP 2008238914 A 10/2008

*Primary Examiner* — Jason C Smith
(74) *Attorney, Agent, or Firm* — St. Onge Steward Johnston & Reens LLC (57) ABSTRACT

A traveling route structure of a conveying traveling body has a traveling route with an area intersecting a crossing aisle, and has a movable rail horizontally openable and closable between a connection working position that connects guide rails in front and rear of the crossing aisle and a retracting position lateral to the crossing aisle. The movable rail has front and a rear movable rails arranged in a line when the movable rails are in the connection working position. Each of the movable rails is pivotally supported so as to be horizontally rotatable about a vertical spindle at each outer end portion positioned outside of the crossing aisle. A locking means couples inner end portions of both movable rails together, with the inner end portions being adjacent to each other when the movable rails are in the connection working position.

7 Claims, 9 Drawing Sheets

(56) References Cited

U.S. PATENT DOCUMENTS

| | | | | |
|---|---|---|---|---|
| 5,303,655 A * | 4/1994 | Summa | E01B 25/10 | |
| | | | 104/140 | |
| 5,544,590 A * | 8/1996 | Summa | B61B 10/04 | |
| | | | 104/130.09 | |
| 5,839,872 A * | 11/1998 | Goto | B66F 9/141 | |
| | | | 414/277 | |
| 6,814,218 B2 * | 11/2004 | Nishihara | B65G 35/06 | |
| | | | 198/370.04 | |
| 7,721,871 B2 * | 5/2010 | Takano | B61B 13/127 | |
| | | | 198/346.2 | |
| 8,312,979 B2 * | 11/2012 | Ooe | B62D 65/18 | |
| | | | 198/346.1 | |
| 8,408,381 B2 * | 4/2013 | Murakami | B65G 35/06 | |
| | | | 198/465.1 | |
| 8,459,438 B2 * | 6/2013 | Ooe | B62D 65/18 | |
| | | | 198/345.1 | |
| 8,469,651 B2 * | 6/2013 | Nishihara | B62D 65/18 | |
| | | | 187/244 | |
| 8,602,203 B2 * | 12/2013 | Nishihara | B65G 35/066 | |
| | | | 104/172.3 | |
| 8,627,942 B2 * | 1/2014 | Terazawa | B62D 65/04 | |
| | | | 104/172.2 | |
| 8,825,205 B2 * | 9/2014 | Yokota | B65G 43/00 | |
| | | | 104/88.01 | |
| 8,862,306 B2 * | 10/2014 | Yokota | G05D 1/028 | |
| | | | 180/167 | |
| 8,978,874 B2 * | 3/2015 | Ooe | B65G 35/06 | |
| | | | 198/465.1 | |
| 9,004,471 B2 * | 4/2015 | Ooe | B62D 65/18 | |
| | | | 254/134 | |
| 2003/0042113 A1 * | 3/2003 | Kasagi | B62D 65/18 | |
| | | | 198/465.1 | |
| 2005/0139158 A1 * | 6/2005 | Matsubara | B65G 49/0459 | |
| | | | 118/400 | |
| 2008/0135382 A1 * | 6/2008 | Nakamura | B61B 10/02 | |
| | | | 198/463.2 | |
| 2009/0090598 A1 * | 4/2009 | Nakamura | B65G 17/48 | |
| | | | 198/345.1 | |
| 2010/0218697 A1 * | 9/2010 | Sugimoto | B61B 13/127 | |
| | | | 104/306 | |
| 2011/0132692 A1 * | 6/2011 | Tada | B61B 10/04 | |
| | | | 187/216 | |
| 2012/0006260 A1 * | 1/2012 | Nishihara | B05C 3/10 | |
| | | | 118/423 | |
| 2012/0006261 A1 * | 1/2012 | Nishihara | B05C 3/10 | |
| | | | 118/426 | |
| 2014/0374214 A1 * | 12/2014 | Nishihara | B05C 3/10 | |
| | | | 198/339.1 | |
| 2015/0166084 A1 * | 6/2015 | Brannstrom | B66C 7/14 | |
| | | | 104/102 | |
| 2015/0336593 A1 * | 11/2015 | Nakamura | B61B 13/125 | |
| | | | 104/48 | |
| 2016/0009497 A1 * | 1/2016 | Nakamura | B61B 13/125 | |
| | | | 198/711 | |

* cited by examiner

TRAVELING ROUTE STRUCTURE OF CONVEYING TRAVELING BODY

FIELD OF THE INVENTION

The present invention relates to a traveling route structure of a conveying traveling body, provided with a traveling route so as to intersect an aisle on the floor.

BACKGROUND OF THE INVENTION

It is known, where a crossing aisle crossing the traveling route of the conveying traveling body is provided on the floor, that elevating guide rails constituting a traveling route part intersecting the crossing aisle are designed to be able to be lowered and retracted into a pit provided under the floor and when the crossing aisle is used for the passage of vehicles, etc., the elevating guide rails are lowered and retracted into the pit such that the vehicles, etc., can pass on the lowered and retracted elevating guide rails, as described in Patent Document 1 (Japanese unexamined patent application publication No. 2008-238914). This configuration is very costly because a pit is needed under the floor, an upper end surface of the elevating guide rail needs to be made flat so as to be a part of the floor of the crossing aisle, a motor-driven drive means having a complicated structure that can horizontally raise and lower the elevating guide rails accurately is needed, etc. On the contrary, a configuration described in Patent Document 2 (Japanese unexamined patent application publication No. H08-48406), although the subject thereof is not the traveling route of the conveying traveling body, is known as a measure in the case where a conveyor arranged on the floor as the same conveying means intersects a crossing aisle, that a conveyor part intersecting the crossing aisle is designed to be detached from conveyors in front and rear of the crossing aisle to be horizontally rotatable, and the horizontally rotatable conveyor part is horizontally opened lateral to the crossing aisle when the crossing aisle is used.

SUMMARY OF THE INVENTION

It is easily thought of that the configuration of the conveyor described in Patent Document 2 is replaced with that of guide rails constituting the traveling route of the conveying traveling body to carry out the invention. However, the guide rails constituting the traveling route of the conveying traveling body which conveys a large automobile vehicle body on an automobile assembly line have a large width between the guide rails juxtaposed in a left and right pair, and support and guide the heavy conveying traveling body including a conveyed object. Accordingly, the guide rail part intersecting the crossing aisle wide enough for the vehicles, etc., to pass, that is, the guide rail part designed to be horizontally rotatable, becomes very large and heavy. Thus, even if the guide rail part is designed to be horizontally rotatable, not only are difficulties involved in manual opening and closing operation but also the inertia in horizontally moving the guide rail part is increased. Therefore, impact in butting and stopping the guide rail part by opening and closing limit stoppers in a connection working position and a retracting position is increased, and opening and closing limit stoppers capable of withstanding the impact are also needed.

The present invention proposes a traveling route structure of a conveying traveling body capable of solving the foregoing conventional problems. Described by giving reference symbols in parentheses used in the description of an embodiment described later in order to facilitate understanding the relationship with the embodiment, the traveling route structure of the conveying traveling body according to the present invention is the one in which a traveling route of the conveying traveling body (1) composed of guide rails (9a, 9b) arranged on a floor has an area intersecting a crossing aisle (14), the area composed of a movable rail horizontally openable and closable between a connection working position that connects the guide rails (9a, 9b) in front and rear of the crossing aisle (14) together and a retracting position lateral to the crossing aisle (14), wherein the movable rail is composed of a front and a rear movable rail (15, 16) arranged in a line when in the connection working position, and each of the movable rails (15, 16) is pivotally supported so as to be horizontally rotatable about a vertical spindle (19, 21) at each outer end portion positioned outside of the crossing aisle (14), and a locking means (28) which couples inner end portions of both movable rails (15, 16) together, the inner end portions adjacent to each other when in the connection working position, is provided.

With the foregoing configuration of the present invention, each length of the two movable rails designed to be horizontally rotatable becomes a half of the length of an opening/closing area of the traveling route of the conveying traveling body which intersects the crossing aisle. Even where the entire movable rails within the opening/closing area are large and heavy, the two movable rails to be opened and closed are half the size and weight, respectively. Therefore, the manual opening and closing operation can be performed safely and easily, and also the impact is reduced to half even where butting and stopping the movable rails by opening and closing limit stoppers. Accordingly, adverse effects on the operation and costs are reduced. With both movable rails closed in the connection working position, the inner end portions of these movable rails are coupled by the locking means. Thus, as compared to the case where both movable rails are fixed on the floor side individually by two locking means, not only a single locking means suffices, but also the inner ends of guide rail units of both movable rails can be held in the connected state reliably.

The front and the rear movable rail (15, 16) may be designed to be opened in mutually opposite directions but can have a double door structure that is openable and closable only on the same side relative to the traveling route, and the locking means (28) can be provided to a side face of left and right both side faces of both movable rails (15, 16) which is on a side where the movable rails are opened to the retracting position. With this configuration, the vertical spindles serving as pivot points of both movable rails and the locking means are concentrated on one side of the traveling route. Therefore, not only is it convenient for maintenance work on these vertical spindles serving as pivot points and the locking means, the disengaging operation of the locking means and the opening and closing operation of the respective movable rails but also can be performed intensively on one side of the traveling route. Workability is improved and safety is enhanced as compared to the case where the operations on both sides of the traveling route are needed.

When a retracted-state locking means (34, 35) fixing the front and the rear movable rail (15, 16) to the floor in the retracting position is juxtaposed, accidents can be prevented from occurring that are expected to occur by the movable rails having been opened to the retracting position being closed and entering the crossing aisle for any contingency.

In addition, a movable stopper piece (44) preventing the conveying traveling body (1) from moving toward the crossing aisle (14) when the movable rails (15, 16) are in the retracting position can be arranged at end portions of the traveling route in front and rear of the crossing aisle (14), and an operating cam (45) for switching the movable stopper piece (44) to a non-operative position when the movable rails (15, 16) are in the connection working position can be provided to each movable rail (15, 16). With this configuration, the fear is avoided that the conveying traveling body having moved for some reason falls to the crossing aisle, resulting in a derailment accident, under circumstances where the respective movable rails are opened to the retracting position in order to use the crossing aisle. Moreover, the movable stopper pieces are automatically switched to the non-operative position by using the movement of the movable rails when the movable rails are closed and returned to the connection working position. Thus, there is no such fear that the movable stopper pieces are damaged when the traveling of the conveying traveling body is started omitting human operation, as in the case where the movable stopper pieces need to be returned to the non-operative position by human operation.

The locking means (28) and the retracted-state locking means (34, 35) may be of any configuration. However, by composing the locking means (28) of an upper plate member (29) and a lower plate member (30) projected from both movable rails (15, 16) so as to overlap each other when both movable rails (15, 16) are in the connection working position and a locking pin (31) inserted throughout through holes (29a, 30a) provided to the upper and lower both plate members (29, 30), and by composing the retracted-state locking means (34, 35) of locking plates (34a, 39a) provided on the floor side so as to respectively overlap the upper and lower plate members (29, 30) of the movable rails (15, 16) and locking pins (31, 34b) inserted throughout through holes of the locking plates (34a, 39a) and the through holes (29a, 30a) of the respective upper and lower plate members (29, 30), at least the upper and lower both plate members of the locking means can be used also as a part of the retracted-state locking means, and as a matter of course, the locking pin of the locking means can be used also as one of the two locking pins necessary for the retracted-state locking means. Therefore, both the locking means and the retracted-state locking means can be carried out inexpensively by reducing the total number of parts.

DETAILED DESCRIPTION OF THE INVENTION

Figure 1:
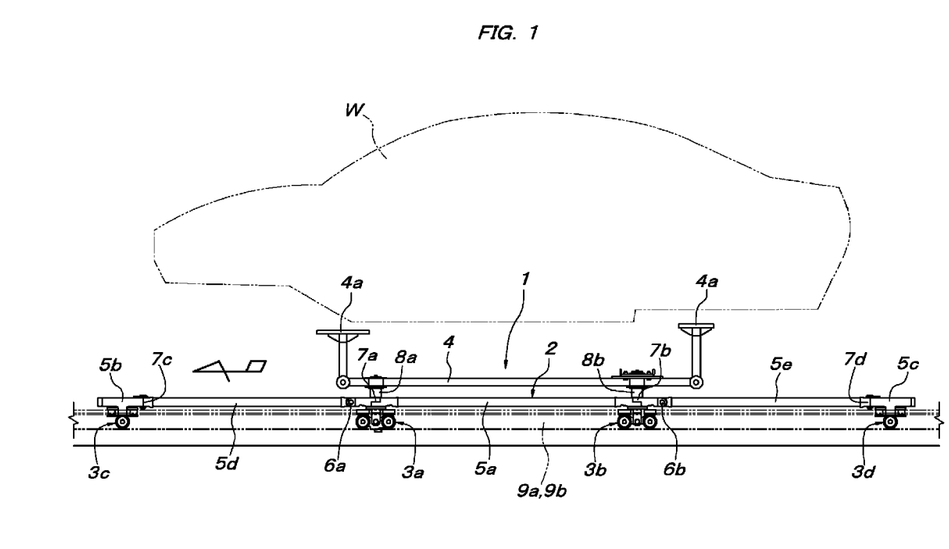
FIG. 1 is a side view of a conveying traveling body.

First, a configuration of a conveying traveling body used in an embodiment of the present invention will be described based on FIGS. 1 to 3. The conveying traveling body 1 is composed of a load bar 2 longer than the entire length of a conveyed object W, a plurality of trolleys 3a to 3d supporting the load bar 2, and a carriage main body 4 supported by a pair of front and rear load trolleys 3a, 3b at intermediate positions of the trolleys. The load bar 2 is composed of a central load bar unit 5a located between the pair of front and rear load trolleys 3a, 3b, front- and rear-end load bar units 5b, 5c integrated with guide trolleys 3c, 3d at both front and rear ends, and a front and a rear intermediate load bar unit 5d, 5e coupling the front- and rear-end load bar units 5b, 5c and the central load bar unit 5a. To allow the conveying traveling body 1 to travel on a horizontal curved route portion and a rising and falling gradient route portion, vertical swing joint portions 6a, 6b and horizontal swing joint portions 7a, 7b are interposed in coupling points between the central load bar unit 5a and the intermediate load bar units 5d, 5e, and horizontal swing joint portions 7c, 7d are interposed in coupling points between the intermediate load bar units 5d, 5e and both front- and rear-end load bar units 5b, 5c. A pair of front and rear column members 8a, 8b supporting the carriage main body 4 are concentrically integrated with vertical spindles of the horizontal swing joint portions 7a, 7b between the central load bar unit 5a and the intermediate load bar units 5d, 5e, and have a lower end coupled to the load trolley 3a, 3b via a right-left lateral horizontal spindle. A conveyed object support base 4a supporting the conveyed object W such as an automobile vehicle body is provided on the carriage main body 4.

The traveling route of the conveying traveling body 1 is constituted of a pair of left and right guide rails 9a, 9b supporting and guiding the respective trolleys 3a to 3d. The load bar 2 has a lateral surface serving as a friction drive surface continuing over the entire length. Thus, friction drive units 13 composed of a friction drive wheel 10 pressure-contacted with the lateral surface (friction drive surface) of the load bar 2, a motor 11 rotationally driving the friction drive wheel 10, and a backup roller 12 sandwiching the load bar 2 with the friction drive wheel 10 are installed side by side in the traveling route. An equally spaced traveling section in which the conveying traveling bodies 1 are each driven at a constant speed at a given interval, a thrust-push traveling section in which the rear end of the load bar 2 of the front-side conveying traveling body 1 is thrust and pushed by the front end of the load bar 2 of the rear-side conveying traveling body 1 and the respective conveying traveling bodies 1 are driven bumper to bumper, etc., are set in the traveling route of the conveying traveling body 1 constituted of the guide rails 9a, 9b. In the equally spaced traveling section, the friction drive units 13 are arranged along the traveling route of the conveying traveling body 1 at regular intervals shorter than the entire length of the load bar 2. In the thrust-push traveling section, the friction drive units 13 are arranged at the entrance and the exit.

Figure 2:
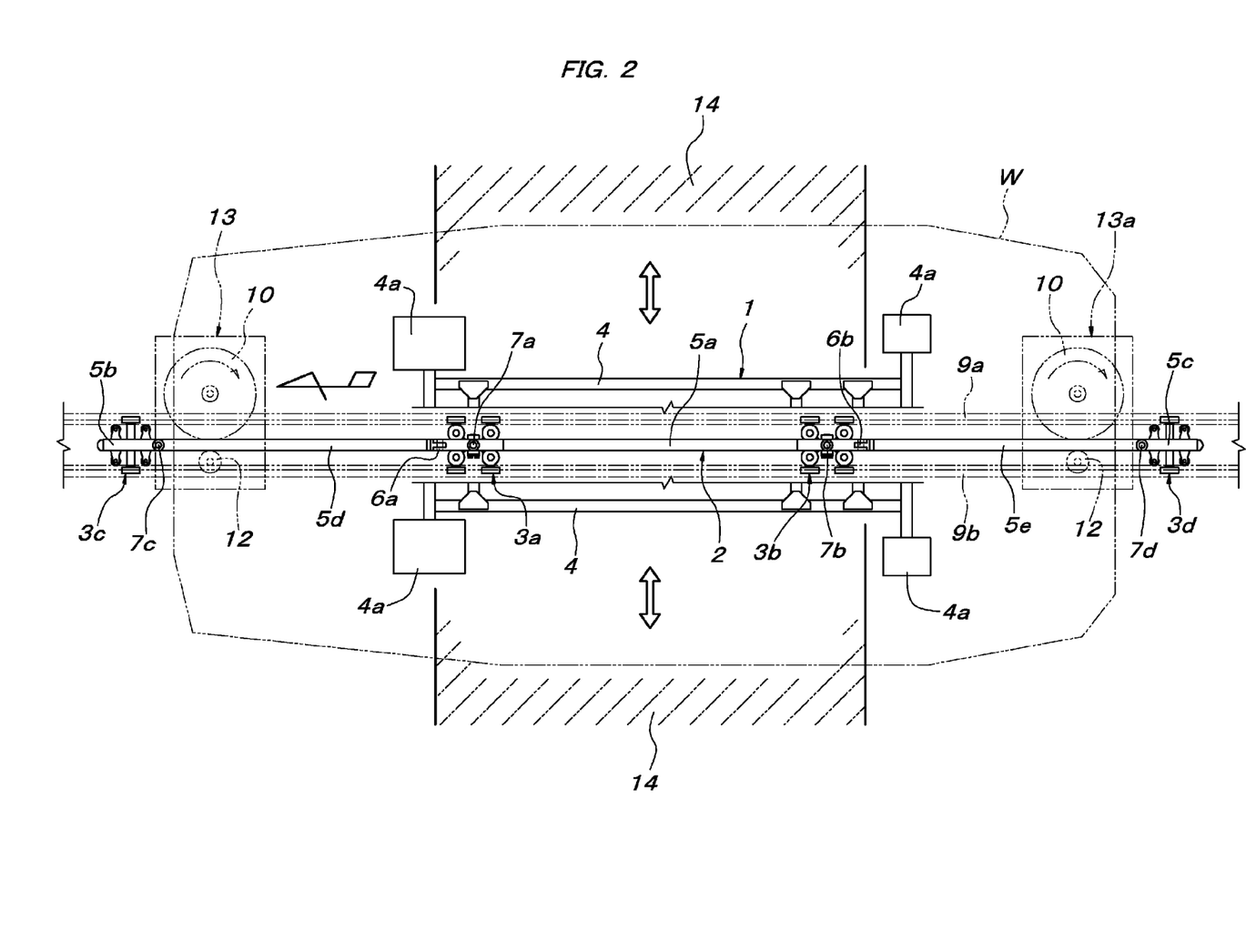
FIG. 2 is a partially cutaway plan view showing the conveying traveling body and a crossing aisle.
Figure 3:
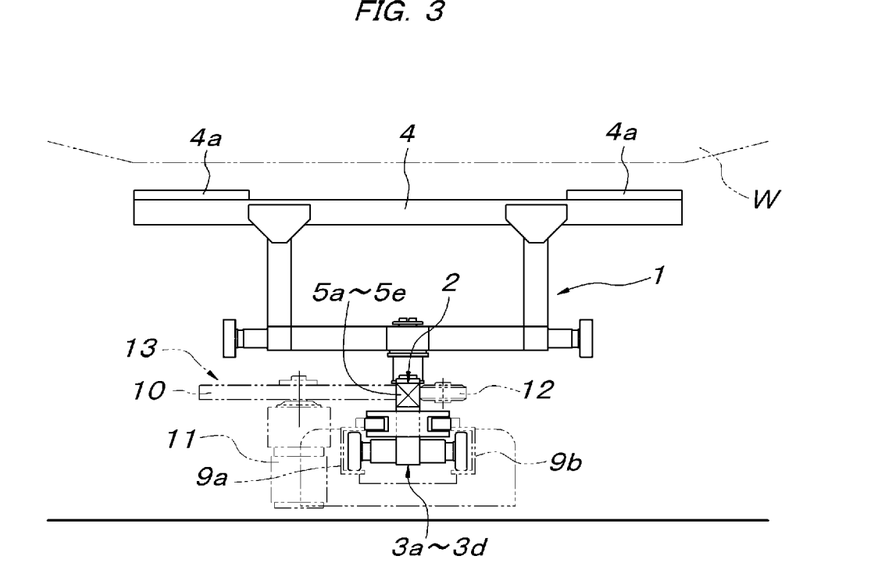
FIG. 3 is a front view of the conveying traveling body.

There are occasions where a crossing aisle 14 intersecting the traveling route is provided, as shown in FIG. 2, in the traveling route of the conveying traveling body 1 as above, in particular in the traveling route within the equally spaced traveling section in which the conveying traveling bodies 1 are each driven at a constant speed at a given interval as described above. This crossing aisle 14 has an aisle width sufficiently shorter than the entire length of the load bar 2 of the conveying traveling body 1. The friction drive units 13 arranged at regular intervals in this equally spaced traveling section are distributed in front and rear of the crossing aisle 14. Accordingly, when the crossing aisle 14 is used, all of the friction drive units 13 including a friction drive unit 13a on the upstream side of the crossing aisle 14 are halted to stop the following conveying traveling body 1 from entering the crossing aisle 14 when the rear end of the load bar 2 of the conveying traveling body 1 traveling within the crossing aisle 14 departs from the friction drive unit 13a on the upstream side of the crossing aisle 14. The use of the crossing aisle 14 is started after the conveying traveling body 1 traveling within the crossing aisle 14 leaves the crossing aisle 14 to the downstream side.

A configuration of a traveling route part of the conveying traveling body 1 intersecting the crossing aisle 14 will be described based on FIGS. 4 to 9. An area intersecting the crossing aisle 14, of the pair of left and right guide rails 9a, 9b constituting the traveling route of the conveying traveling body 1 is replaced with a pair of front and rear movable rails 15, 16. The movable rails 15, 16 are each formed such that a pair of left and right guide rail units 15a, 15b or 16a, 16b having the same necessary length as that of the guide rails 9a, 9b are laid on a movable base 17, 18.

The movable rail 15 on the upstream side is such that the guide rail unit 15a on one side thereof is coupled to an end portion of the guide rail 9a connected to the upstream side, so as to be horizontally swingable about a vertical spindle 19 adjacent outside the guide rail unit 15a and the guide rail 9a (the side opposite to the side where the guide rail 9b is located). The movable base 17 has a bottom portion whose four corners are attached with orientation-fixed wheels 20a to 20d rolling on the floor in such orientation that each axial center extension line in a plan view intersects the axial center of the vertical spindle 19. The movable rail 16 on the downstream side is such that the guide rail unit 16a on one side thereof is coupled to an end portion of the guide rail 9b connected to the downstream side, so as to be horizontally swingable about a vertical spindle 21 adjacent outside the guide rail unit 16a and the guide rail 9a (the side opposite to the side where the guide rail 9b is located). The movable base 18 has a bottom portion whose four corners are attached with orientation-fixed wheels 22a to 22d rolling on the floor in such orientation that each axial center extension line in a plan view intersects the axial center of the vertical spindle 21. As a matter of course, caster wheels can be used instead of the orientation-fixed wheels 20a to 20d, 22a to 22d.

Figure 4:
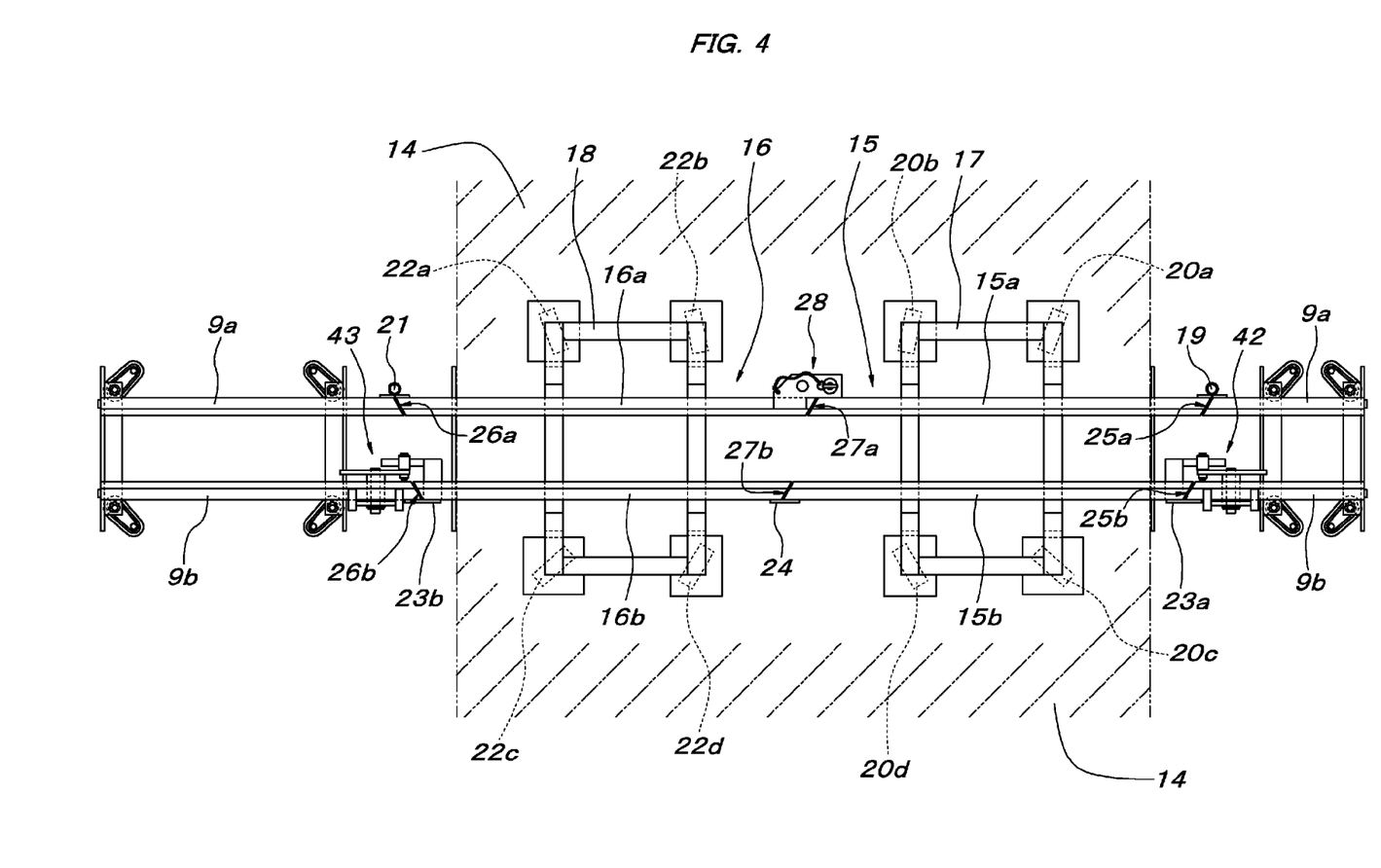
FIG. 4 is a plan view showing a configuration of a traveling route of the conveying traveling body at an intersection with the crossing aisle.
Figure 5A:
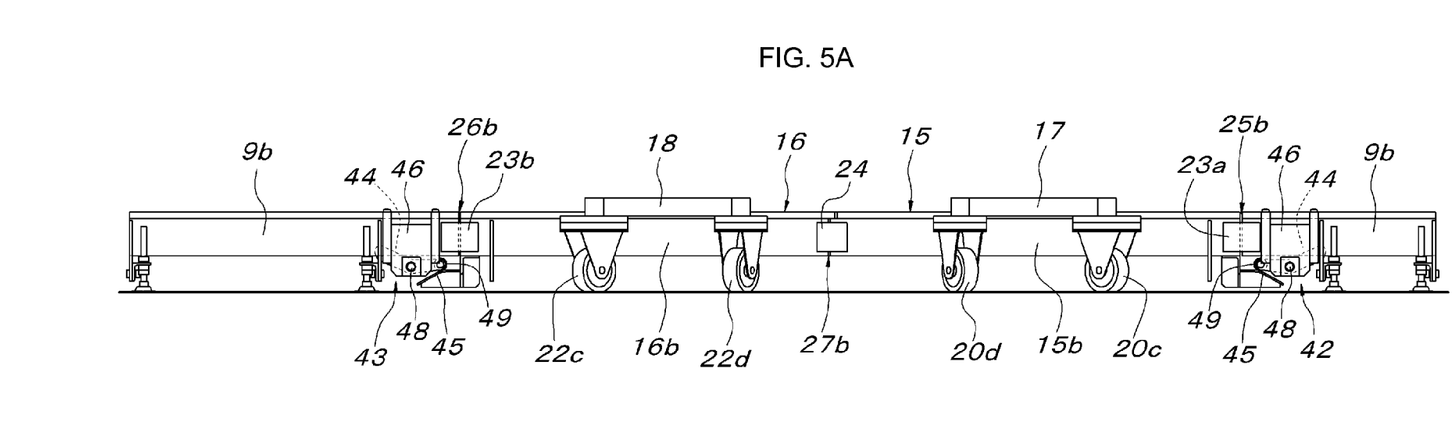
FIG. 5A is a side view of FIG. 4
Figure 5B:
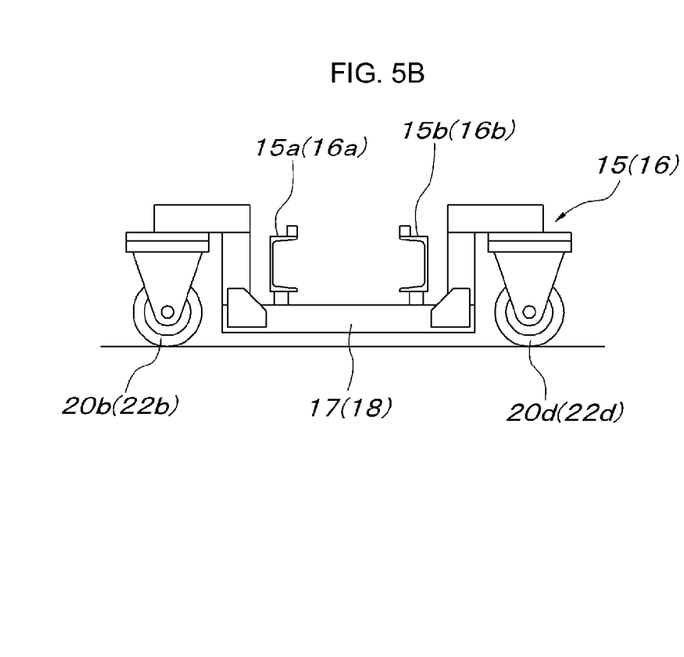
FIG. 5B is a longitudinal sectional view of movable rails.

As shown in FIG. 4, a blocking plate 23a abutting outside an upstream-side end portion of the guide rail unit 15b of the movable rail 15 (the side opposite to the side where the guide rail unit 15a is located) when the movable rails 15, 16 are in a connection working position in which respective guide rail units 15a, 15b and 16a, 16b are connected to each other and the guide rail units 15a, 15b and 16a, 16b connect the guide rails 9a, 9b on the upstream and downstream sides linearly is fixed outside an end portion of the guide rail 9b adjacent to the upstream-side end portion of the guide rail unit 15b, and a blocking plate 23b abutting outside a downstream-side end portion of the guide rail unit 16b of the movable rail 16 (the side opposite to the side where the guide rail unit 16a is located) is fixed outside an end portion of the guide rail 9b adjacent to the downstream-side end portion of the guide rail unit 16b. Reference symbol 24 denotes a blocking plate fixed outside a distal end of the guide rail unit 15b of the movable rail 15 and receives a distal end of the guide rail unit 16b of the movable rail 16. Thus, the movable rails 15, 16 can only horizontally rotate (horizontally open) from the connection working position toward the side where the guide rail units 15a, 16a are located relative to the guide rail units 15b, 16b.

When both movable rails 15, 16 are in the connection working position as described above, a connection point 25b between the guide rail unit 15b and the guide rail 9b on the upstream side is slightly shifted toward the traveling direction of the conveying traveling body 1, that is, to the side where the crossing aisle 14 is located, relative to a connection point between the guide rail unit 15a of the movable rail 15 and the guide rail 9a on the upstream side, that is, a connection point 25a adjacent to the vertical spindle 19, and a connection point 26b between the guide rail unit 16b and the guide rail 9b on the downstream side is slightly shifted toward a direction opposite to the traveling direction of the conveying traveling body 1, that is, to the side where the crossing aisle 14 is located, relative to a connection point between the guide rail unit 16a of the movable rail 16 and the guide rail 9a on the upstream side, that is, a connection point 26a adjacent to the vertical spindle 21. A connection point 27a between the guide rail units 15a and 16a in both movable rails 15, 16 and a connection point 27b between the guide rail units 15b and 16b are also shifted with respect to each other in the traveling direction of the conveying traveling body 1. In this embodiment, the connection point 27b between the guide rail units 15b and 16b is slightly shifted toward the traveling direction of the conveying traveling body 1 relative to the connection point 27a between the guide rail units 15a and 16a.

The shifting of the positions of the connection points 25a to 27b between the paired left and right rails is for suppressing the shock that the conveying traveling body 1 receives and the occurrence of abnormal sounds when the paired left and right rollers of each trolley 3a to 3d of the conveying traveling body 1 traveling and passing through the crossing aisle 14 simultaneously pass through the connection points between the paired left and right rails. In order to further enhance this suppression effect, rail end sides forming the connection points 25a, 25b, 27a, 27b are obliquely formed such that ends away from the vertical spindle 19 are shifted toward the direction of travel of the conveying traveling body 1 in a plan view. Rail end sides forming the connection points 26a, 26b are obliquely formed such that ends nearer to the vertical spindle 21 are shifted toward the direction of travel of the conveying traveling body 1 in a plan view.

Figure 7A:
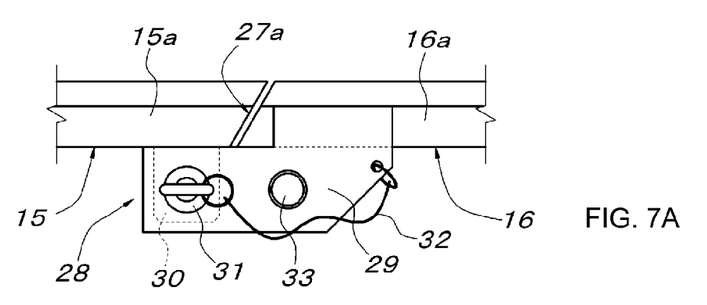
FIG. 7A is a plan view showing a locking means which locks a pair of movable rails in a connection working position.
Figure 7B:
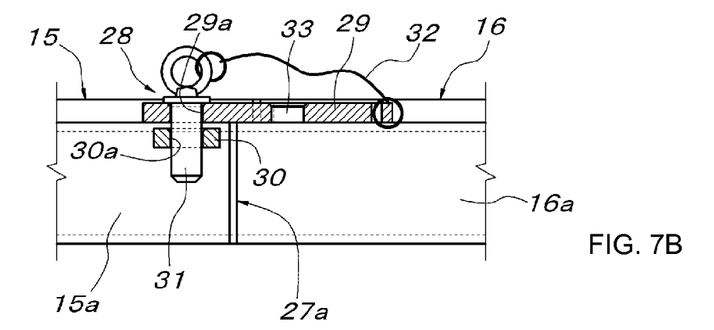
FIG. 7B is a longitudinal sectional side view of the locking means.

A locking means 28 for locking both movable rails 15, 16 in the connection working position is provided between the movable rails 15, 16. This locking means 28 is composed of an upper plate member 29 fixed to an upper surface of a free end portion of the guide rail unit 16a of the movable rail 16 on the downstream side and extending outside a free end portion of the guide rail unit 15a of the movable rail 15 on the upstream side, a lower plate member 30 fixed and projected outside the free end portion of the guide rail unit 15a of the movable rail 15 on the upstream side so as to be overlapped under the upper plate member 29, and a locking pin 31 inserted from above into through holes 29a, 30a concentrically provided to the overlapping portions of the upper and lower both plate members 29, 30, and received by the upper surface of the upper plate member 29. Reference symbol 32 denotes a string-like tie member such as a chain, a wire, a rope, etc., for keeping the locking pin 31 tied to a proximal portion of the upper plate member 29. The upper plate member 29 is provided with an auxiliary through hole 33 for supporting the locking pin 31 having been pulled out of the through holes 29a, 30a.

Figure 6:
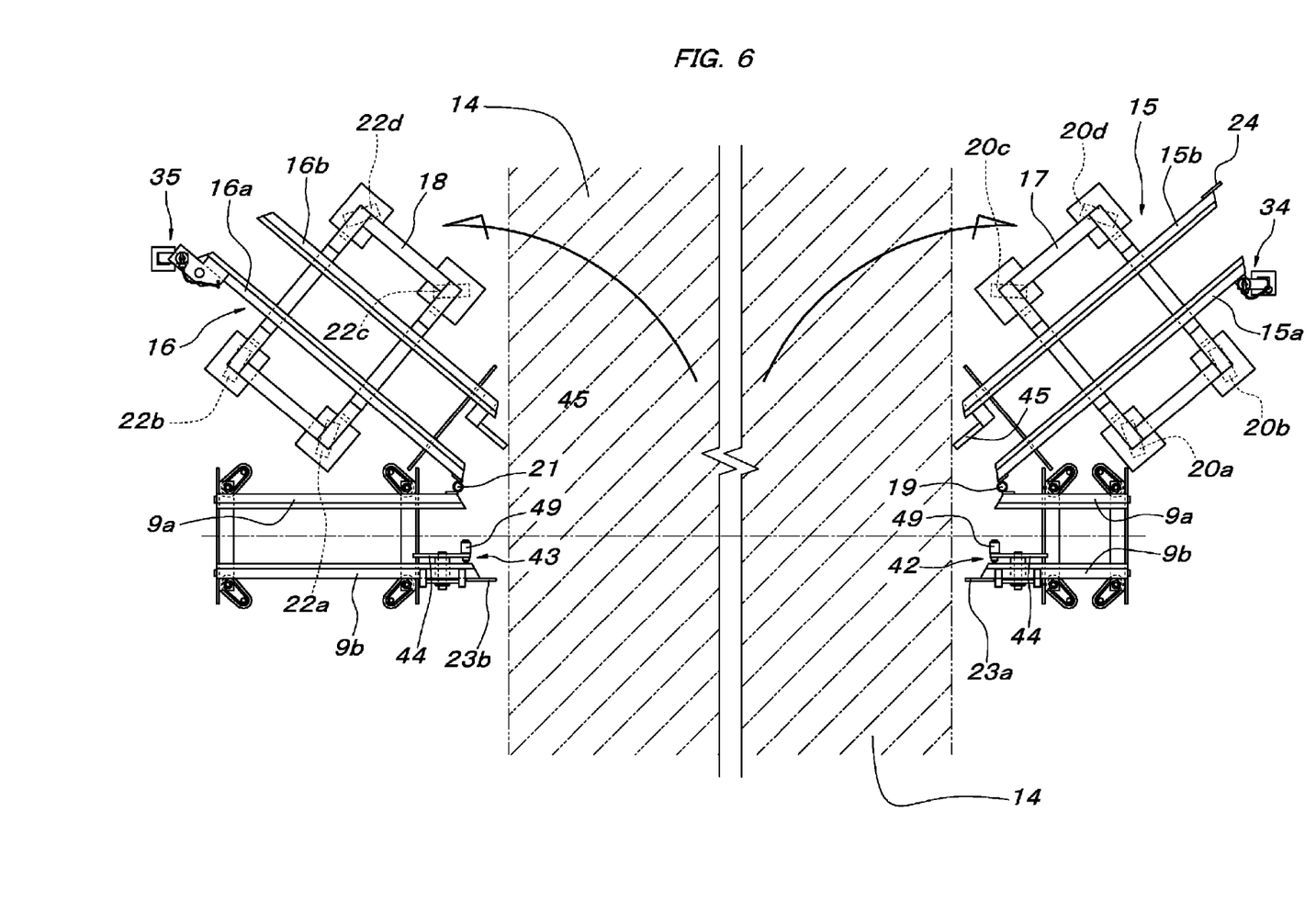
FIG. 6 is a plan view showing a state of movable rails shown in FIG. 4 being opened, respectively.

With the above configuration, the conveying traveling body 1 whose trolleys 3a to 3d are respectively supported and guided by the guide rails 9a, 9b can be made to travel and pass on the crossing aisle 14 via the guide rail units 15a to 16b of the connected movable rails 15, 16 without problems by inserting the locking pin 31 from above into the through holes 29a, 30a of the vertically overlapped upper and lower both plate members 29, 30 of the locking means 28 in a state that each movable rail 15, 16 is horizontally closed about the vertical spindle 19, 21 to the connection working position of being received by the blocking plates 23a, 23b, 24, and then coupling both movable rails 15, 16 to each other to put them into a horizontally unswingable locked state. When the crossing aisle 14 is used for the passage of vehicles, etc., the friction drive unit 13 on the upstream side of this crossing aisle 14 is halted at the previously described timing, and the locking pin 31 of the locking means 28 is pulled out to release the locking after the conveying traveling body 1 leaves from within the crossing aisle 14 to the downstream side, and the movable rails 15, 16 are horizontally opened about the vertical spindles 19, 21 as shown in FIG. 6 while the locking pin 31 is inserted in the auxiliary through hole 33 of the upper plate member 29 according to need, and then the movable rails 15, 16 are switched to the retracting position outside the crossing aisle 14. As a result, space on the crossing aisle 14 is left open and the vehicles, etc., can safely pass through the crossing aisle 14 intersecting the traveling route of the conveying traveling body 1.

In the configuration of the embodiment, the opening operation of the movable rails 15, 16 needs to be performed simultaneously or the movable rail 15 on the upstream side needs to be opened after the movable rail 16 on the downstream side is opened in advance. When the use of the crossing aisle 14 is completed and the traveling route of the conveying traveling body 1 is reconnected, it is only necessary to close both movable rails 15, 16 to the original connection working position in the reverse order to when opening the same and to couple both movable rails 15, 16 to each other by the locking means 28.

Figure 7C:
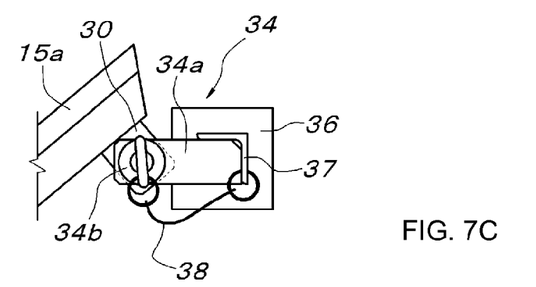
FIG. 7C is a plan view of a retracted-state locking means which locks one of the movable rails in a retracting position.

The traveling route structure of a conveying traveling body according to the embodiment of the present invention described above can be used as above. As shown in FIG. 6, it is preferable to provide a retracted-state locking means 34, 35 to lock both movable rails 15, 16 in the retracting position in order to prevent the movable rails 15, 16 from accidentally closing into the crossing aisle 14 when opened to the retracting position for the use of the crossing aisle 14. A specific configuration of the retracted-state locking means 34, 35 in this embodiment will be described. The retracted-state locking means 34 for the movable rail 15 is composed of a locking plate 34a overlapped on the lower plate member 30 fixed and projected outside the free end of the guide rail unit 15a when the movable rail 15 is opened up to the retracting position and a locking pin 34b, as shown in FIG. 7C. The locking plate 34a is fixed and projected horizontally and laterally from an upper end portion of a column member 37 erected on a base plate 36 fixed on the floor. By inserting the locking pin 34b into a vertical through hole provided to the locking plate 34a and the through hole 30a provided to the lower plate member 30 of the movable rail 15 side, the retracted-state locking means 34 locks the movable rail 15 in the retracting position. The locking pin 34b is supported on the locking plate 34a in the inserted state and is tied to the column member 37 (or may be the locking plate 34a) by a string-like tie member 38 such as a chain, a wire, a rope, etc.

Figure 7D:
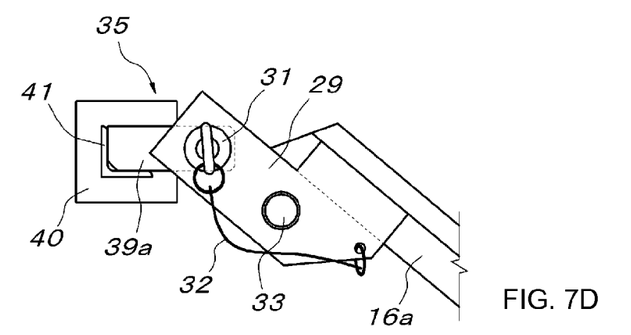
FIG. 7D is a plan view of a retracted-state locking means which locks the other movable rail in a retracting position.

The retracted-state locking means 35 for the movable rail 16 is composed of a locking plate 39 overlapped under the upper plate member 29 fixed and projected outside the free end of the guide rail unit 16a when the movable rail 16 is opened up to the retracting position and the locking pin 31 of the locking means 28, as shown in FIG. 7D. The locking plate 39 is fixed and projected horizontally and laterally from an upper end portion of a column member 41 erected on a base plate 40 fixed on the floor. By inserting the locking pin 31 into a vertical through hole provided to the locking plate 39 and the through hole 29a provided to the upper plate member 29 of the movable rail 16 side, the retracted-state locking means 35 locks the movable rail 16 in the retracting position.

Although stoppers for receiving the movable rails 15, 16 in the retracting position (opening limit position) when the movable rails 15, 16 are opened to the retracting position are not illustrated, it is preferred to provide the stoppers by using the column members 37, 41, etc., of the retracted-state locking means 34, 35.

In principle, it does not happen that the conveying traveling body 1 travels toward the crossing aisle 14 under circumstances where the movable rails 15, 16 are switched to the retracting position in order to use the crossing aisle 14. However, the possibility is conceivable that the conveying traveling body 1 starts to move due to some contingency and the front-end guide trolley 3c (the rear-end guide trolley 3d in the case where the conveying traveling body accidentally travels backward) is derailed and falls toward the crossing aisle 14 from end portions of the guide rails 9a, 9b disconnected in the crossing aisle 14. In order to prepare for such contingency, as shown in FIG. 4 and FIG. 6, automatic stopper devices 42, 43 can be juxtaposed at an upstream-side traveling route end portion and a downstream-side traveling route end portion relative to the movable rails 15, 16.

Figure 8:
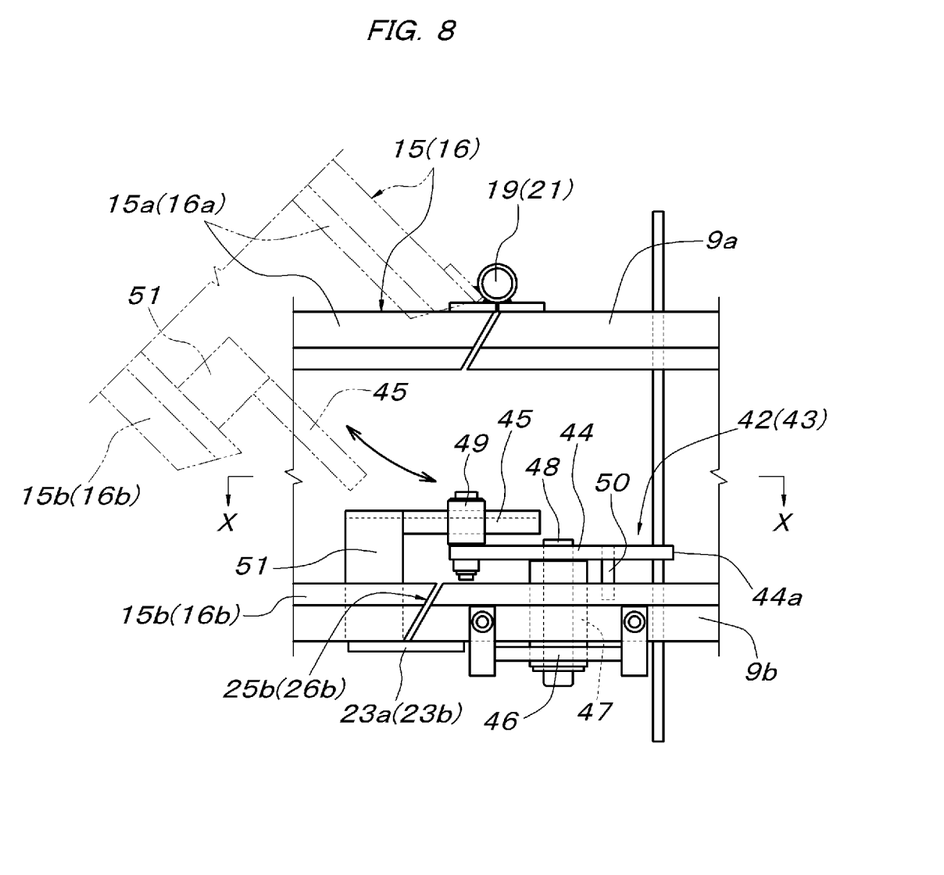
FIG. 8 is a plan view of a main part showing the movable rail and a conveying traveling body stopper.
Figure 9A:
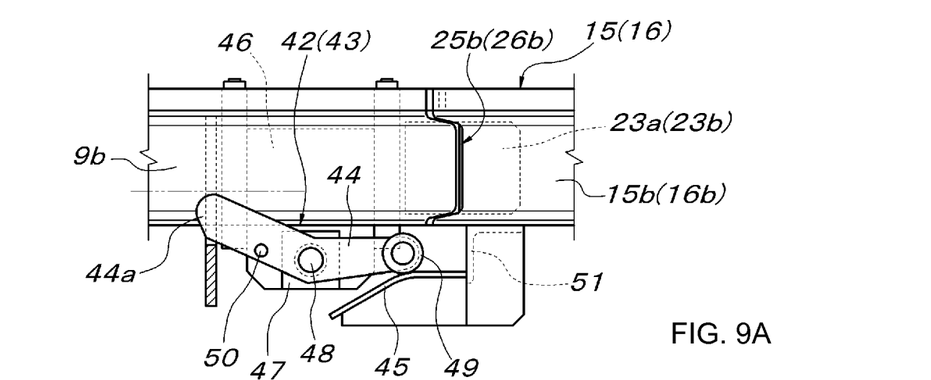
FIG. 9A is a sectional view taken along line X-X of FIG. 8.
Figure 9B:
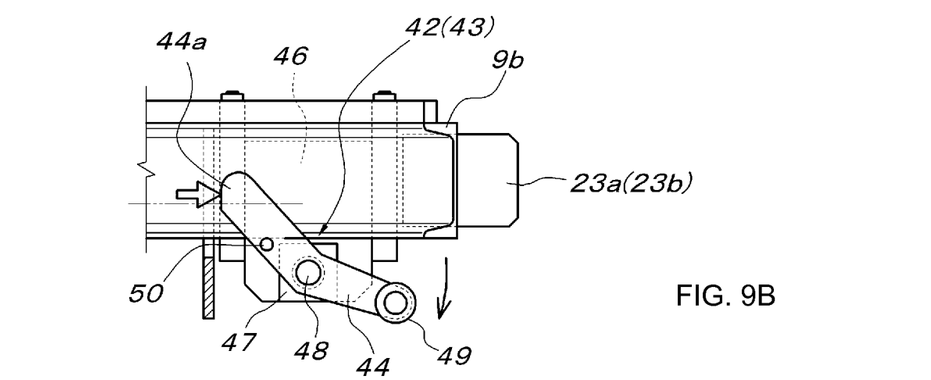
FIG. 9B is a sectional view taken along line X-X of FIG. 8, showing the conveying traveling body stopper when the movable rail is rotated.

Both automatic stopper devices 42, 43 have the same structure and are each composed of a movable stopper piece 44 provided on the inner side of the end portion of the guide rail 9b connected with the guide rail unit 15a, 16b of the movable rail 15, 16, and an operating cam 45 provided on the inner side of the end portion of the guide rail unit 15b, 16b of the movable rail 15, 16 adjacent to the end portion of the guide rail 9b, as shown in FIG. 8 and FIG. 9. The movable stopper piece 44 is pivotally supported by a right-left lateral horizontal support spindle 48 so as to be capable of vertical seesaw movement, to a bearing 47 fixed to a vertical base plate 46 attached on the outer side of the guide rail 9b, and protruded horizontally inward below the guide rail 9b. The movable stopper piece 44 has an end portion on the side where the movable rail 15, 16 is located, to which end portion a cam follower roller 49 is pivotally supported by a right-left lateral horizontal spindle. In the situation shown in FIG. 6 in which the movable rail 15, 16 is opened to the retracting position, the movable stopper piece 44 is designed such that the side where the cam follower roller 49 is located tilts to be lowered by the weight of the cam follower roller 49 (a spring may be used together) and a stopper pin 50 projectingly provided to the movable stopper piece 44 abuts against the lower surface of the guide rail 9b when the movable stopper piece 44 reaches an operative position, as shown in FIG. 9B. An operating end 44a of the movable stopper piece 44 on the side opposite to the side where the cam follower roller 49 is located at this time is protruded within a movement track of a bearing portion of rollers (rollers fitted to the guide rails 9a, 9b and pivotally supported by horizontal spindles) of the front- and rear-end both guide trolleys 3c, 3d of the conveying traveling body 1 shown in FIGS. 1 to 3.

The operating cam 45 provided on the inner side of the end portion of the guide rail unit 15b, 16b of the movable rail 15, 16 is attached along an inner end portion of a support member 51 fixed and projected inward from below the end portion of the guide rail unit 15a, 16b, in such a manner so as to protrude from the end of the guide rail unit 15b, 16b toward the side where the guide rail 9b is located. The operating cam 45 picks up the cam follower roller 49 of the movable stopper piece 44 when the movable rail 15, 16 is closed to the connection working position shown in FIG. 4, and the operating cam 45 rotates the movable stopper piece 44 about the horizontal spindle 48 against gravity to a direction in which the operating end 44a is lowered, and retracts the operating end 44a under the traveling route of the conveying traveling body 1.

With the automatic stopper devices 42, 43 of the above configuration, the conveying traveling body 1 can travel and pass on the crossing aisle 14 via the movable rails 15, 16 without being affected by the presence of the automatic stopper devices 42, 43 since the movable stopper pieces 44 of the automatic stopper devices 42, 43 arranged on the end portions of the traveling route in front and rear of the crossing aisle 14 are held in the non-operative position of retracting under the traveling route of the conveying traveling body 1 when the movable rails 15, 16 are closed in the connection working position that connects the traveling route (guide rails 9a, 9b) in front and rear of the crossing aisle 14 together. When the movable rails 15, 16 are opened to the retracting position in order to use the crossing aisle 14, the movable stopper pieces 44 of the automatic stopper devices 42, 43 are automatically switched to the operative position and the end portions of the traveling route divided by the crossing aisle 14 which are adjacent to the crossing aisle 14 are closed. If the conveying traveling bodies 1 on the traveling route on both sides of the crossing aisle 14 accidentally move toward the crossing aisle 14 for some reason, the front-end guide trolley 3c or the rear-end guide trolley 3d of the conveying traveling body 1 can be received by the operating end 44a of the movable stopper piece 44 and forcibly halted.

The pair of front and rear movable rails 15, 16 are designed to be openable and closable like double doors on the same side of the traveling route in the foregoing embodiment. However, they can also be designed such that the movable rail 15 is opened and closed on the left side of the traveling route and the movable rail 16 is opened and closed on the right side of the traveling route when the connection points 27a, 27b between the guide rail units 15a, 15b and the guide rail units 16a, 16b of the movable rails 15, 16 are as in the shown example. Further, the opening and closing operation of the movable rails 15, 16 can be carried out manually by an operator, but a power source such as a motor can be used separately to open and close the movable rails 15, 16 by motive power instead of manpower depending on the circumstances. Furthermore, the configuration of the locking means 28 coupling the inner end portions of both movable rails 15, 16 closed in the connection working position together is not limited to the one in the foregoing embodiment. For example, a long locking pin is used as the locking pin 31, and a hole into which a lower end of the locking pin 31 having been inserted from above into the through holes 29a, 30a of the upper and lower both plate members 29, 30 is fitted is provided on the floor side, and the positions of the inner end portions of both movable rails 15, 16 can also be fixed with respect to the floor at the same time as when the inner end portions are coupled together.

The locking means 28 switching into the locking state by human operation has been shown. However, it can be an automatic locking means which automatically engages when both movable rails 15, 16 are closed to the connection working position (closing limit position) of being in a line. In addition, the unlocking operation of the locking means 28 also should not be limited to manual operation. Such as human switching operation under circumstances where the safety is confirmed, the locking means can be such that the unlocking is automatically carried out by an appropriate actuator such as a cylinder unit or solenoid when specific conditions are met. When the locking means having such an automatic unlocking function is provided, both movable rails 15, 16 are preferably designed to be opened by motive power in a predetermined order as previously described.

The traveling route structure of the conveying traveling body of the present invention can be utilized as a means for safely allowing the passage of vehicles, etc., in a crossing aisle in a layout that is provided with the crossing aisle so as to intersect the traveling route of the conveying traveling body traveling on guide rails laid on the floor.

What is claimed is:

1. A traveling route structure of a conveying traveling body comprising:
    a traveling route of the conveying traveling body, a crossing aisle, and an intersection area where the traveling route intersects with the crossing aisle;
    the traveling route including guide rails arranged on a floor in front and rear of the crossing aisle and front and rear movable rails in the intersection area;
    the front and rear movable rails being horizontally openable and closable between a connection working position that connects the guide rails in front and rear of the crossing aisle together and a retracted position lateral to the crossing aisle, wherein the front and rear movable rails are arranged in a line when in the connection working position;
    each of the front and rear movable rails being pivotally supported so as to be horizontally rotatable about a vertical spindle at an outer end portion positioned outside of the crossing aisle; and
    locking means operable to couple inner end portions of the front and rear movable rails together, the inner end portions being adjacent to each other when in the connection working position.

2. The traveling route structure of the conveying traveling body according to claim 1, wherein the front and the rear movable rails are arranged in a double door configuration that is openable only toward one side of the traveling route, and the locking means is provided on a side face of both the left and right movable rails which is adjacent the one side of the traveling route.

3. The traveling route structure of the conveying traveling body according to claim 1, further comprising retracted-state locking means operable to fix the front and the rear movable rails relative to the floor in the retracted position.

4. The traveling route structure of the conveying traveling body according to claim 1, further comprising movable stoppers operable to prevent the conveying traveling body from moving toward the crossing aisle when the front and rear movable rails are in the retracted position, the movable stoppers being disposed at end portions of the traveling route in front and rear of the crossing aisle, and an operating cam associated with each movable stopper which is operable to switch the associated movable stopper to a non-operative position when the front and rear movable rails are in the connection working position.

5. The traveling route structure of the conveying traveling body according to claim 3, wherein the locking means comprises an upper plate member and a lower plate member projected from both the front and rear movable rails so as to overlap each other when the front and rear movable rails are in the connection working position and a locking pin insertable in through holes in the upper and lower plate members, and the retracted-state locking means comprises locking plates provided on the floor so as to respectively overlap the upper and lower plate members of the front and rear movable rails and locking pins insertable in through holes of the locking plates and the through holes of the respective upper and lower plate members.

6. The traveling route structure of the conveying traveling body according to claim 2, further comprising retracted-state locking means operable to fix the front and the rear movable rails relative to the floor in the retracted position.

7. The traveling route structure of the conveying traveling body according to claim 6, wherein the locking means comprises an upper plate member and a lower plate member projected from both the front and rear movable rails so as to overlap each other when the front and rear movable rails are in the connection working position and a locking pin insertable in through holes in the upper and lower plate members, and the retracted-state locking means comprises locking plates provided on the floor so as to respectively overlap the upper and lower plate members of the front and rear movable rails and locking pins insertable in through holes of the locking plates and the through holes of the respective upper and lower plate members.

* * * * *